(12) United States Patent
Meagher, III et al.

(10) Patent No.: US 11,748,339 B2
(45) Date of Patent: Sep. 5, 2023

(54) ANONYMIZATION OF QUERY INFORMATION WHILE RETAINING QUERY STRUCTURE AND SIZING INFORMATION

(71) Applicant: Maplebear, Inc., San Francisco, CA (US)

(72) Inventors: John Paul Meagher, III, San Francisco, CA (US); Jonathan Brandon Phillips, Berkeley, CA (US)

(73) Assignee: Maplebear, Inc., San Francisco, CA (US)

( * ) Notice: Subject to any disclaimer, the term of this patent is extended or adjusted under 35 U.S.C. 154(b) by 250 days.

(21) Appl. No.: 17/207,527

(22) Filed: Mar. 19, 2021

(65) Prior Publication Data
US 2022/0300493 A1 Sep. 22, 2022

(51) Int. Cl.
*G06F 16/242* (2019.01)
*G06F 16/2455* (2019.01)

(52) U.S. Cl.
CPC ........ *G06F 16/242* (2019.01); *G06F 16/2455* (2019.01)

(58) Field of Classification Search
CPC .................................................... G06F 16/242
See application file for complete search history.

(56) References Cited

U.S. PATENT DOCUMENTS

| 2013/0198218 A1* | 8/2013 | Wu ........................ G06F 16/278 707/E17.014 |
| 2022/0245574 A1* | 8/2022 | Cella ....................... G06F 9/451 |

* cited by examiner

Primary Examiner — Van H Oberly
(74) Attorney, Agent, or Firm — Fenwick & West LLP

(57) ABSTRACT

When analyzing operation of an online system, such as an online concierge system, that receive queries from users and return results in response to those queries, queries received by the online system may include different numbers of terms. The variations in numbers of terms included in different queries makes it difficult to efficiently group queries for analysis, resulting in inefficient analysis of individual queries when analyzing different queries based on their structure. To more efficiently analyze different queries, the online system groups queries based on a number of terms in the query. In some embodiments, queries are grouped based on a logarithmic scale of the number of terms in the query, while in other embodiments queries are grouped based on a square root of the number of terms in the query.

16 Claims, 6 Drawing Sheets

| Received Query | Representation of Query |
|---|---|
| Query: term1, term2, term3 | Query: 0 |
| Query: term1, term2, term3, term4, term5, term6, term7, term8, term9, term10 | Query: 1 |

FIG. 6

ANONYMIZATION OF QUERY INFORMATION WHILE RETAINING QUERY STRUCTURE AND SIZING INFORMATION

BACKGROUND

This disclosure relates generally to analyzing queries received by an online concierge system, and more specifically to anonymizing received queries while retaining structure of the query and information describing size of the query.

In current online concierge systems, shoppers (or "pickers") fulfill orders at a physical warehouse, such as a retailer, on behalf of users as part of an online shopping concierge service. An online concierge system provides an interface to a user identifying items offered by a physical warehouse and receives selections of one or more items for an order from the user. Current online concierge systems may send shoppers to various warehouses with instructions to fulfill orders for items, and the shoppers then find the items included in the user order in a warehouse.

Users provide queries to an online concierge system to identify items offered by a warehouse and receive results from the online concierge system including items satisfying the received queries. From the results, a user selects items for inclusion in an order to be fulfilled. To simply user interaction, many online concierge systems allow users to provide queries with variable lengths, allowing users to include varying numbers of terms in a query.

An online concierge system may review processing of previously received queries to determine how to more efficiently allocate resources for returning results for subsequently received queries. While providing users with flexibility in numbers of terms in queries simplifies interaction with the online system by users, this increased flexibility increases complexity of subsequent analysis of how the queries were processed to return results. With variable length queries received, an online concierge system is often unable to analyze processing of different queries in parallel given the varying numbers of terms in different queries

SUMMARY

An online system, such as an online concierge system receives a query from a user. The query has a syntactical structure including specific operators and a payload that comprises one or more terms with specific values. For example, the query includes an operator identifying a field to search and one or more terms that are values to search for within the field identified by the operator. Hence, the syntactical structure identifies which portion, or portions, of the query include operators, and which portion, or portions of the queries, include terms specified by the user. Many queries received by the online system have variable lengths, as users may provide varying numbers of terms. Additionally, the online system does not provide limitations on the numbers of terms that can be included in many queries, providing a wide range of possible lengths of queries received from users. While this flexibility in numbers of terms in queries simplifies interaction with the online system by users, this increased flexibility increases difficulty of the online system in subsequently evaluating its performance in processing and returning results for different queries.

To more efficiently evaluate processing of the received query, the online system extracts the syntactical structure of the received query by identifying the operators included in the received query and the terms corresponding to each of the identified operators. For example, the query includes an operator specifying a name field and an operator specifying a keyword field, so the online system parses the query to extract the name field and one or more terms identifying values within the name field and to extract the keyword field along with one or more terms identifying values within the keyword field. This allows the online system to identify different operators within the query and to identify the terms corresponding to the different operators.

When analyzing processing (e.g., processing time, time to return results) of the received query, anonymizing the terms specifying particular values allows the online system to account for numbers of terms included in the query for different operators, providing information about the length of payload, without using the specific values of the terms in the payload. Hence, anonymizing the terms allows the online concierge system to identify and analyze performance when processing queries having different numbers of terms, so the online system determines a number of terms in the payload of the received query.

To allow for more efficient grouping of queries for analysis, the online system selects a range of a plurality of numbers including the number of terms in the payload of the received query. The online system maintains a plurality of ranges, with each range including a plurality of numbers, so selecting the range allows the online system to provide a more generalized representation of a number of terms in the payload. In some embodiments, the online system determines a logarithm in a specific base of the number of terms in the payload of the received query and selects a range corresponding to a plurality of numbers that includes the determined logarithm. For example, the online system determines a logarithm in base ten or a logarithm in base two of the number of terms in the payload and selects a range of numbers including the determined logarithm.

Alternatively, the online system determines a square root of the number of terms in the payload of the received query and selects a range corresponding to numbers including the determined square root of the number of terms in the payload. In some embodiments, the online system uses one more characteristics to determine whether to determine a logarithm in a specific base of the number of terms in the payload or to determine a square root of a number of terms in the payload. For example, if characteristics of the online system satisfy one or more criteria, the online system determines a quantity as a logarithm in the specific base of the number of terms of the payload of the received query and determines the quantity as a square root of the number of terms in the payload of the received query if characteristics of the online system satisfy one or more alternative criteria.

In other embodiments, the online system maintains a set of rules mapping numbers of terms in a payload to ranges that each include multiple numbers. The online system compares a number of terms in the payload to numbers in different ranges specified by the set of rules and selects a range from the set of rules including the number of terms in the payload. Different sets of rules may be maintained for different syntactical structures of queries in some embodiments, although the online system may maintain different sets of rules corresponding to any suitable criteria and identify a set of rules defining various ranges based on criteria satisfied by the received query or by any other suitable parameter.

The online system generates a representation of the received query having the syntactical structure of the received query with the payload replaced by the selected range including the number of terms in the payload. Hence, the representation replaces the terms in the received payload with the selected range including the number of terms in the payload. For example, the received query includes an operator identifying a keyword field and 5 terms for identifying within the keyword field, so the generated representation of the received query includes the operator identifying the keyword field and a range that includes 5. This allows the representation of the received query to provide information describing a length of the received query, while simplifying grouping of queries for analysis. Using specific lengths of received queries for analysis would result in a greater variance in lengths of payloads, resulting in minor differences in payload length preventing queries from being grouped together. Thus, representing the length of queries by ranges including the number of terms in their respective payloads allows the online system to increase a number of queries grouped together to reduce computational resources and time for analyzing how different queries were processed.

BRIEF DESCRIPTION OF THE DRAWINGS

FIG. 6 is an example of representations of queries generated from received queries, in accordance with one embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
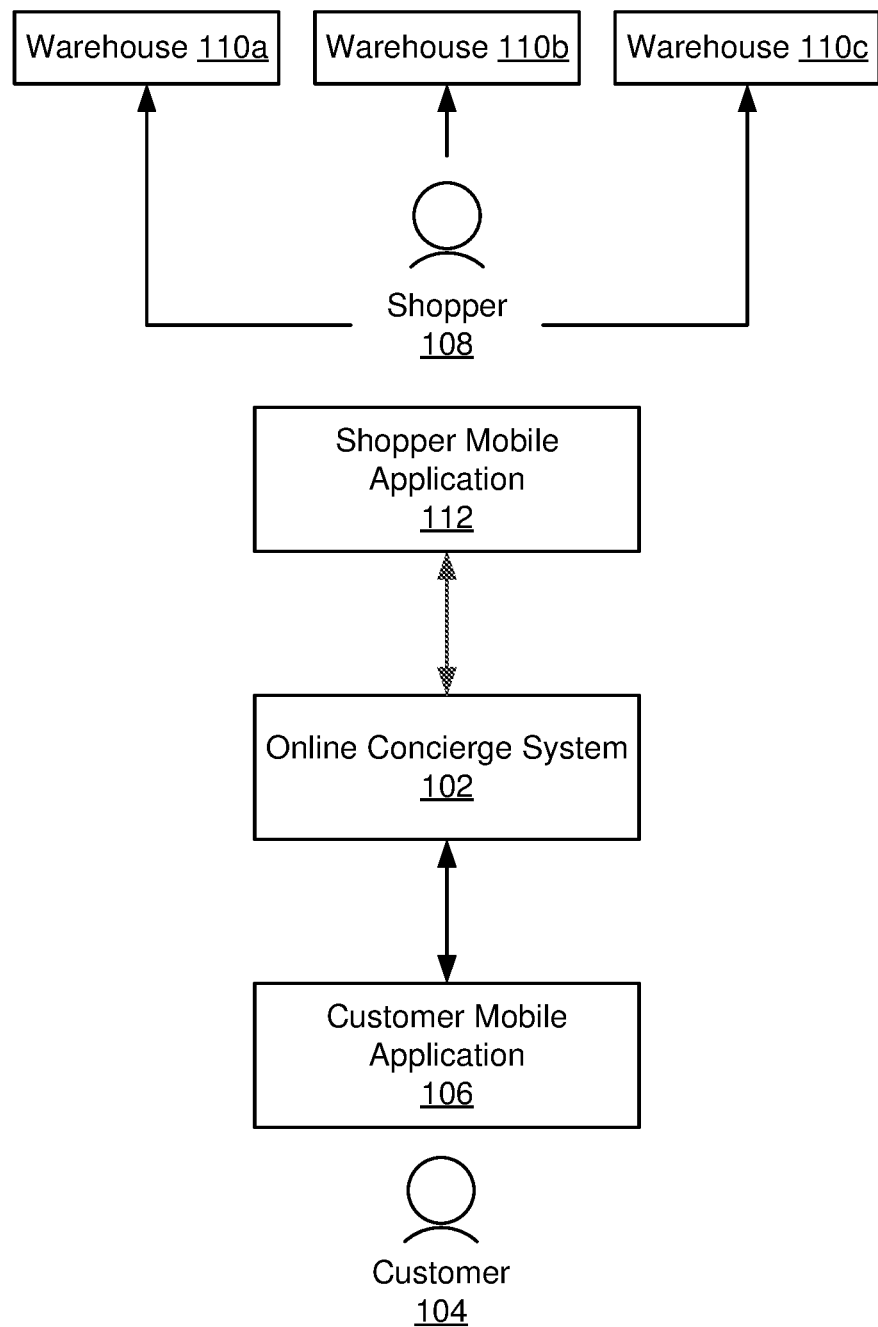
FIG. 1 illustrates an environment of an online shopping concierge service, according to one embodiment.

FIG. 1 illustrates an environment 100 of an online platform, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The system 102 is configured to receive orders from one or more users 104 (only one is shown for the sake of simplicity). An order specifies a list of goods (items or products) to be delivered to the user 104. The order also specifies the location to which the goods are to be delivered, and a time window during which the goods should be delivered. In some embodiments, the order specifies one or more retailers from which the selected items should be purchased. The user may use a customer mobile application (CMA) 106 to place the order; the CMA 106 is configured to communicate with the online concierge system 102.

The online concierge system 102 is configured to transmit orders received from users 104 to one or more shoppers 108. A shopper 108 may be a contractor, employee, other person (or entity), robot, or other autonomous device enabled to fulfill orders received by the online concierge system 102. The shopper 108 travels between a warehouse and a delivery location (e.g., the user's home or office). A shopper 108 may travel by car, truck, bicycle, scooter, foot, or other mode of transportation. In some embodiments, the delivery may be partially or fully automated, e.g., using a self-driving car. The environment 100 also includes three warehouses 110a, 110b, and 110c (only three are shown for the sake of simplicity; the environment could include hundreds of warehouses). The warehouses 110 may be physical retailers, such as grocery stores, discount stores, department stores, etc., or non-public warehouses storing items that can be collected and delivered to users. Each shopper 108 fulfills an order received from the online concierge system 102 at one or more warehouses 110, delivers the order to the user 104, or performs both fulfillment and delivery. In one embodiment, shoppers 108 make use of a shopper mobile application 112 which is configured to interact with the online concierge system 102.

Figure 2:
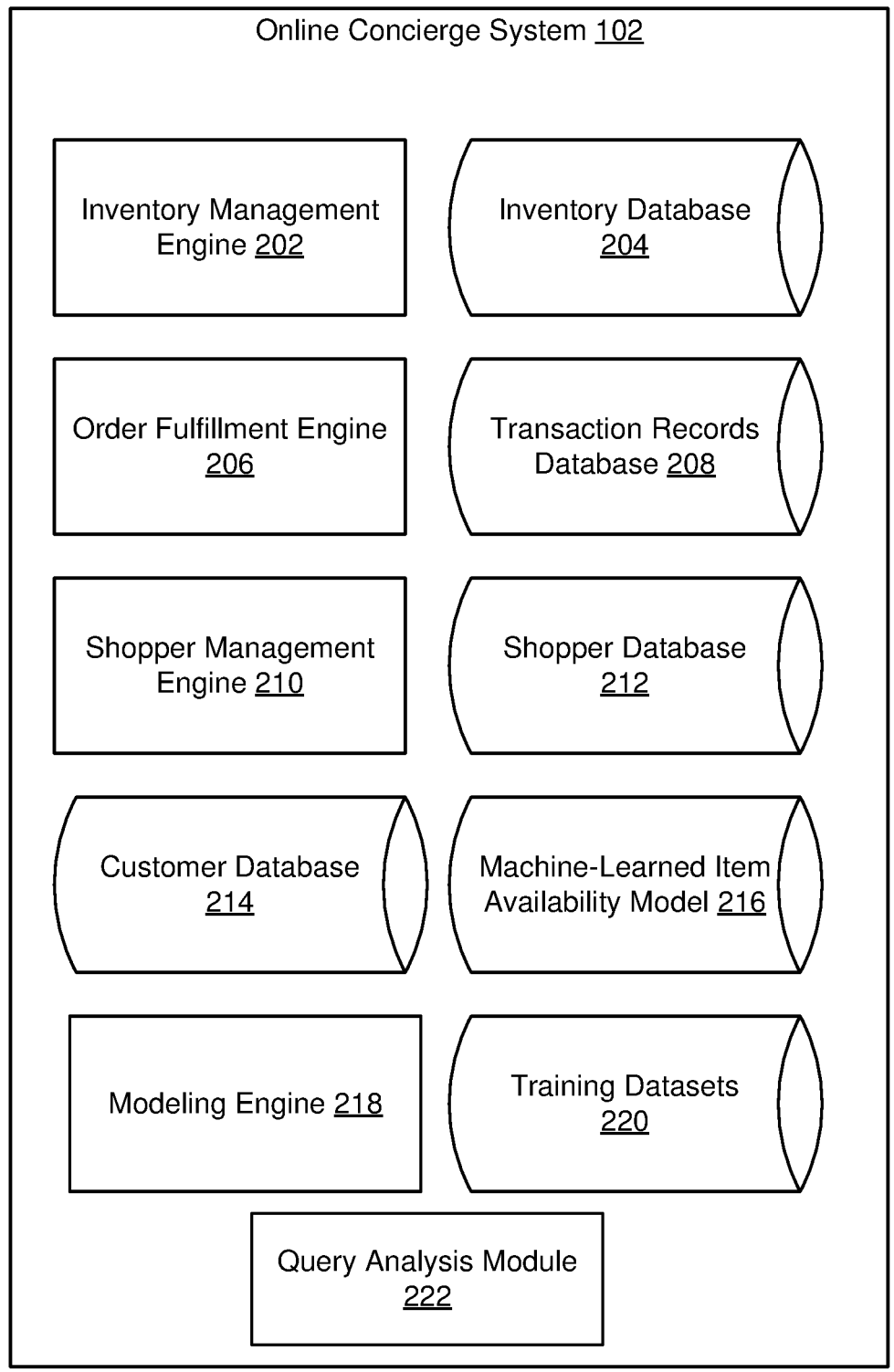
FIG. 2 is a diagram of an online shopping concierge system, according to one embodiment.

FIG. 2 is a diagram of an online concierge system 102, according to one embodiment. The online concierge system 102 includes an inventory management engine 202, which interacts with inventory systems associated with each warehouse 110. In one embodiment, the inventory management engine 202 requests and receives inventory information maintained by the warehouse 110. The inventory of each warehouse 110 is unique and may change over time. The inventory management engine 202 monitors changes in inventory for each participating warehouse 110. The inventory management engine 202 is also configured to store inventory records in an inventory database 204. The inventory database 204 may store information in separate records—one for each participating warehouse 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204. Additional inventory information useful for predicting the availability of items may also be stored in the inventory database 204. For example, for each item-warehouse combination (a particular item at a particular warehouse), the inventory database 204 may store a time that the item was last found, a time that the item was last not found (a shopper looked for the item but could not find it), the rate at which the item is found, and the popularity of the item.

Inventory information provided by the inventory management engine 202 may supplement the training datasets 220. Inventory information provided by the inventory management engine 202 may not necessarily include information about the outcome of picking a delivery order associated with the item, whereas the data within the training datasets 220 is structured to include an outcome of picking a delivery order (e.g., if the item in an order was picked or not picked).

The online concierge system 102 also includes an order fulfillment engine 206 which is configured to synthesize and display an ordering interface to each user 104 (for example, via the customer mobile application 106). The order fulfillment engine 206 is also configured to access the inventory database 204 in order to determine which products are available at which warehouse 110. The order fulfillment engine 206 may supplement the product availability information from the inventory database 204 with an item availability predicted by the machine-learned item availability model 216. The order fulfillment engine 206 determines a sale price for each item ordered by a user 104. Prices set by the order fulfillment engine 206 may or may not be identical to in-store prices determined by retailers (which is the price that users 104 and shoppers 108 would pay at the retail warehouses). The order fulfillment engine 206 also facilitates transactions associated with each order. In one embodiment, the order fulfillment engine 206 charges a payment instrument associated with a user 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with warehouses 110. For example, after successful fulfillment of an order, the order fulfillment engine 206 may transmit a summary of the order to the appropriate warehouses 110. The summary may indicate the items purchased, the total value of the items, and in some cases, an identity of the shopper 108 and user 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a shopper management engine 210, which manages communication with and utilization of shoppers 108. In one embodiment, the shopper management engine 210 receives a new order from the order fulfillment engine 206. The shopper management engine 210 identifies the appropriate warehouse to fulfill the order based on one or more parameters, such as a probability of item availability determined by a machine-learned item availability model 216, the contents of the order, the inventory of the warehouses, and the proximity to the delivery location. The shopper management engine 210 then identifies one or more appropriate shoppers 108 to fulfill the order based on one or more parameters, such as the shoppers' proximity to the appropriate warehouse 110 (and/or to the user 104), his/her familiarity level with that particular warehouse 110, and so on. Additionally, the shopper management engine 210 accesses a shopper database 212 which stores information describing each shopper 108, such as his/her name, gender, rating, previous shopping history, and so on.

As part of fulfilling an order, the order fulfillment engine 206 and/or shopper management engine 210 may access a user database 214 which stores information describing each user. This information could include each user's name, address, gender, shopping preferences, favorite items, stored payment instruments, and so on.

Additionally, the query analysis module 222 retrieves queries the online concierge system 102 previously received from the transaction records database 208, as well as results the online concierge system 102 provided in response to the received queries. The query analysis module 220 determines processing time for the online concierge system 102 to return results for a query and may further determine amounts of computational resources the online concierge system 102 expended to return results for a query. As queries received by the online concierge system 102 have variable lengths, to more efficiently analyze queries, the query analysis module 222 anonymizes a received query by removing specific values for terms and retaining information identifying a number of terms included in the query. This allows the query analysis module to account for lengths of queries without assessing specific terms. Further, to allow grouping of queries for analysis, rather than account for specific lengths of different queries, the query analysis module 222 identifies a range of numbers that includes a number of terms in a query, and generates a representation of a query that identifies syntax of the query and the range including the number of terms in the query. This allows the query analysis module 222 to identify larger groups of queries for analysis based on the ranges included in representations of queries, as further described below in conjunction with FIGS. 5 and 6.

Machine Learning Models

The online concierge system 102 further includes a machine-learned item availability model 216, a modeling engine 218, and training datasets 220. The modeling engine 218 uses the training datasets 220 to generate the machine-learned item availability model 216. The machine-learned item availability model 216 can learn from the training datasets 220, rather than follow only explicitly programmed instructions. The inventory management engine 202, order fulfillment engine 206, and/or shopper management engine 210 can use the machine-learned item availability model 216 to determine a probability that an item is available at a warehouse 110. The machine-learned item availability model 216 may be used to predict item availability for items being displayed to or selected by a user or included in received delivery orders. A single machine-learned item availability model 216 is used to predict the availability of any number of items.

The machine-learned item availability model 216 can be configured to receive as inputs information about an item, the warehouse for picking the item, and the time for picking the item. The machine-learned item availability model 216 may be adapted to receive any information that the modeling engine 218 identifies as indicators of item availability. At minimum, the machine-learned item availability model 216 receives information about an item-warehouse pair, such as an item in a delivery order and a warehouse at which the order could be fulfilled. Items stored in the inventory database 204 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 204. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 204 and/or warehouse database and provide this extracted information as inputs to the item availability model 216.

The machine-learned item availability model 216 contains a set of functions generated by the modeling engine 218 from the training datasets 220 that relate the item, warehouse, and timing information, and/or any other relevant inputs, to the probability that the item is available at a warehouse. Thus, for a given item-warehouse pair, the machine-learned item availability model 216 outputs a probability that the item is available at the warehouse. The machine-learned item availability model 216 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 216 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper, or predicted to be unavailable but found by the shopper). In some examples, the confidence score is based in part on the age of the data for the item, e.g., if availability information has been received within the past hour, or the past day. The set of functions of the item availability model 216 may be updated and adapted following retraining with new training datasets 220. The machine-learned item availability model 216 may be any machine learning model, such as a neural network, boosted tree, gradient boosted tree or random forest model. In some examples, the machine-learned item availability model 216 is generated from XGBoost algorithm.

The item probability generated by the machine-learned item availability model 216 may be used to determine instructions delivered to the user 104 and/or shopper 108, as described in further detail below.

The training datasets 220 relate a variety of different factors to known item availabilities from the outcomes of previous delivery orders (e.g. if an item was previously found or previously unavailable). The training datasets 220 include the items included in previous delivery orders, whether the items in the previous delivery orders were picked, warehouses associated with the previous delivery orders, and a variety of characteristics associated with each of the items (which may be obtained from the inventory database 204). Each piece of data in the training datasets 220 includes the outcome of a previous delivery order (e.g., if the item was picked or not). The item characteristics may be determined by the machine-learned item availability model 216 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 216 may weight these factors differently, where the weights are a result of a "learning" or training process on the training datasets 220. The training datasets 220 are very large datasets taken across a wide cross section of warehouses, shoppers, items, warehouses, delivery orders, times and item characteristics. The training datasets 220 are large enough to provide a mapping from an item in an order to a probability that the item is available at a warehouse. In addition to previous delivery orders, the training datasets 220 may be supplemented by inventory information provided by the inventory management engine 202. In some examples, the training datasets 220 are historic delivery order information used to train the machine-learned item availability model 216, whereas the inventory information stored in the inventory database 204 include factors input into the machine-learned item availability model 216 to determine an item availability for an item in a newly received delivery order. In some examples, the modeling engine 218 may evaluate the training datasets 220 to compare a single item's availability across multiple warehouses to determine if an item is chronically unavailable. This may indicate that an item is no longer manufactured. The modeling engine 218 may query a warehouse 110 through the inventory management engine 202 for updated item information on these identified items.

Machine Learning Factors

The training datasets 220 include a time associated with previous delivery orders. In some embodiments, the training datasets 220 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 220 include a day of the week previous delivery orders were placed. The day of the week may impact item availability, since popular shopping days may have reduced inventory of items or restocking shipments may be received on particular days. In some embodiments, training datasets 220 include a time interval since an item was previously picked in a previously delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 220 include a time interval since an item was not found in a previous delivery order. If there has been a short time interval since an item was not found, this may indicate that there is a low probability that the item is available in subsequent delivery orders. And conversely, if there is has been a long time interval since an item was not found, this may indicate that the item may have been restocked and is available for subsequent delivery orders. In some examples, training datasets 220 may also include a rate at which an item is typically found by a shopper at a warehouse, a number of days since inventory information about the item was last received from the inventory management engine 202, a number of times an item was not found in a previous week, or any number of additional rate or time information. The relationships between this time information and item availability are determined by the modeling engine 218 training a machine learning model with the training datasets 220, producing the machine-learned item availability model 216.

The training datasets 220 include item characteristics. In some examples, the item characteristics include a department associated with the item. For example, if the item is yogurt, it is associated with the dairy department. The department may be the bakery, beverage, nonfood and pharmacy, produce and floral, deli, prepared foods, meat, seafood, dairy, the meat department, or dairy department, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability, since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 202. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 218 training a machine learning model with the training datasets 220, producing the machine-learned item availability model 216.

The training datasets 220 may include additional item characteristics that affect the item availability and can therefore be used to build the machine-learned item availability model 216 relating the delivery order for an item to its predicted availability. The training datasets 220 may be periodically updated with recent previous delivery orders. The training datasets 220 may be updated with item availability information provided directly from shoppers 108. Following updating of the training datasets 220, a modeling engine 218 may retrain a model with the updated training datasets 220 and produce a new machine-learned item availability model 216.

Customer Mobile Application

Figure 3A:
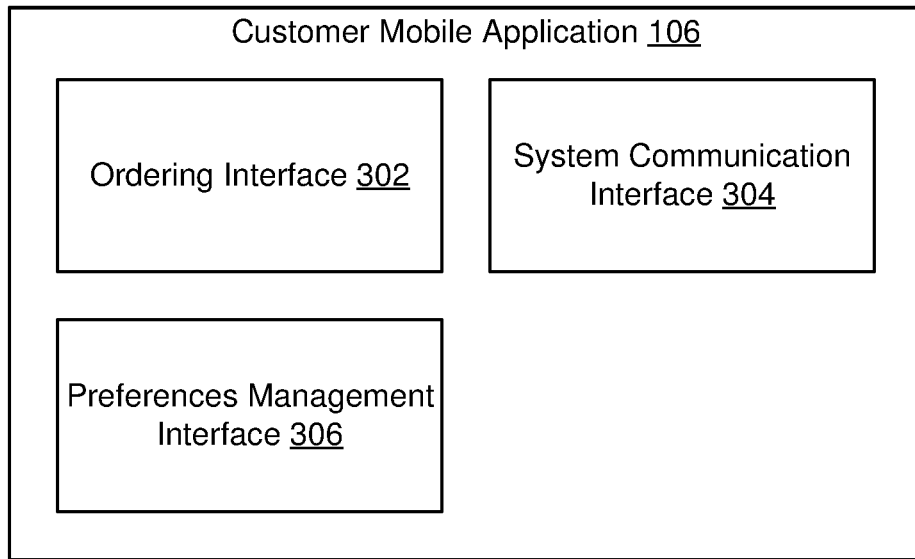
FIG. 3A is a diagram of a customer mobile application (CMA), according to one embodiment.

FIG. 3A is a diagram of the customer mobile application (CMA) 106, according to one embodiment. The CMA 106 includes an ordering interface 302, which provides an interactive interface with which the user 104 can browse through and select products and place an order. The CMA 106 also includes a system communication interface 304 which, among other functions, receives inventory information from the online shopping concierge system 102 and transmits order information to the system 102. The CMA 106 also includes a preferences management interface 306 which allows the user 104 to manage basic information associated with his/her account, such as his/her home address and payment instruments. The preferences management interface 306 may also allow the user to manage other details such as his/her favorite or preferred warehouses 110, preferred delivery times, special instructions for delivery, and so on.

Shopper Mobile Application

Figure 3B:
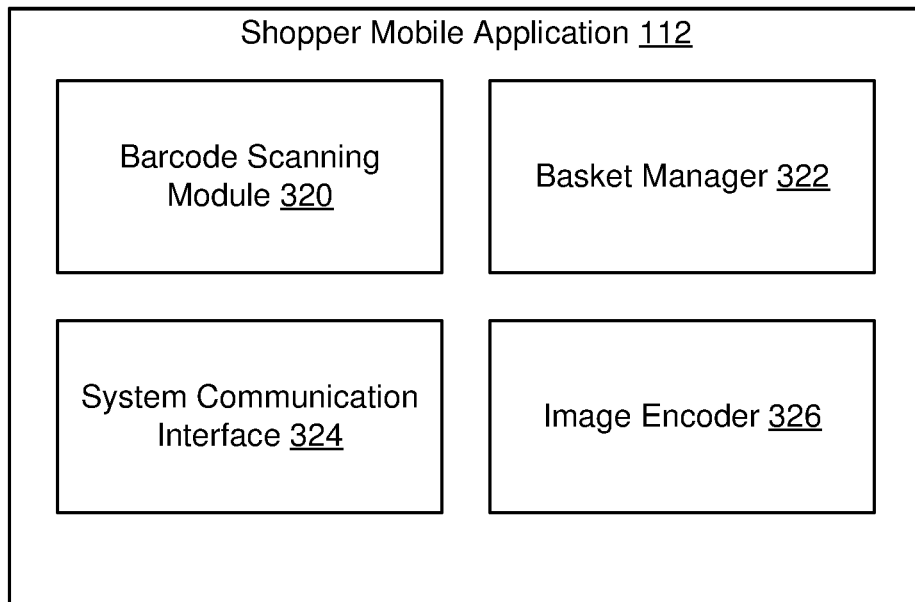
FIG. 3B is a diagram of a shopper mobile application (SMA), according to one embodiment.

FIG. 3B is a diagram of the shopper mobile application (SMA) 112, according to one embodiment. The SMA 112 includes a barcode scanning module 320 which allows a shopper 108 to scan an item at a warehouse 110 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned. SMA 112 also includes a basket manager 322 which maintains a running record of items collected by the shopper 108 for purchase at a warehouse 110. This running record of items is commonly known as a "basket". In one embodiment, the barcode scanning module 320 transmits information describing each item (such as its cost, quantity, weight, etc.) to the basket manager 322, which updates its basket accordingly. The SMA 112 also includes a system communication interface 324 which interacts with the online shopping concierge system 102. For example, the system communication interface 324 receives an order from the system 102 and transmits the contents of a basket of items to the system 102. The SMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

Predicting Inventory Availability

Figure 4:
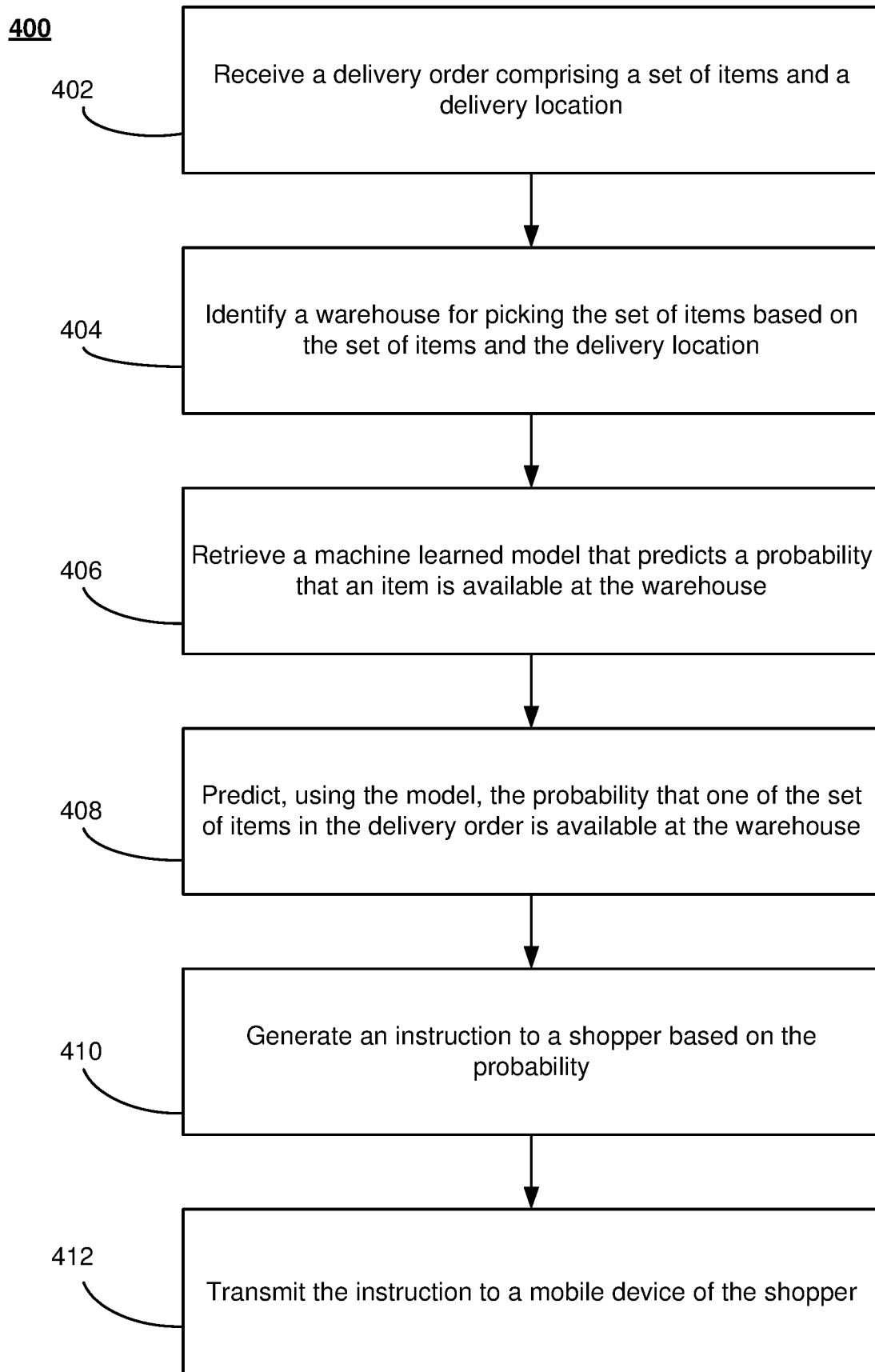
FIG. 4 is a flowchart of a method for predicting inventory availability, according to one embodiment.

As described with reference to FIG. 2, the machine-learned item availability model 216 of the online concierge system 102 can determine an availability of an item requested by the user 104. FIG. 4 is a flowchart illustrating a process 400 for predicting inventory availability, according to one embodiment. The online concierge system 102 receives 402 a delivery order that includes a set of items and a delivery location. The delivery location may be any location associated with a user, such as a user's home or office. The delivery location may be stored with the user location in the user database 214. Based on the delivery order, the online concierge system 102 identifies a warehouse 404 for picking the set of items in the delivery order based on the set of items and the delivery location. In some cases, the user specifies a particular warehouse or set of warehouses (e.g., a particular grocery store or chain of grocery stores) in the order. In other cases, the online concierge system 102 selects the warehouse based on the items and the delivery location. In some examples, there are a number of different possible warehouses that the set of items may be picked from. The warehouses may be identified by the order fulfillment engine 206 based on warehouses stored by the inventory management engine 202, and warehouses are identified with a suitable inventory and within a threshold distance of the delivery address. In some embodiments, a single delivery order can be split into multiple orders and picked at multiple warehouses, e.g., if the items cannot be fulfilled at a single warehouse. In this example, each possible warehouse is input into the machine-learned item availability model 216.

After the warehouses are identified, the online concierge system 102 retrieves 406 the machine-learned item availability model 216 that predicts a probability that an item is available at the warehouse. The items in the delivery order and the identified warehouses are input into the machine-learned item availability model 216. For example, the online concierge system 102 may input the item, warehouse, and timing characteristics for each item-warehouse pair into the machine-learned item availability model 216 to assess the availability of each item in the delivery order at each potential warehouse at a particular day and/or time. The machine-learned item availability model 216 predicts 408 the probability that one of the set of items in the delivery order is available at the warehouse. If a number of different warehouses are identified 404, then the machine-learned item availability model 216 predicts the item availability for each one. In some examples, the probability that an item is available includes a probability confidence score generated by the machine-learned item availability model 216.

The order fulfillment engine 206 uses the probability to generate 410 an instruction to a shopper. The order fulfillment engine 206 transmits the instruction to the shopper through the SMA 112 via the shopper management engine 210. The instruction is based on the predicted probability. In some examples, the shopper management engine 210 instructs the shopper to pick an item in the delivery order at a warehouse with the highest item availability score. For example, if a warehouse is more likely to have more items in the delivery order available than another warehouse, then the shopper management engine 210 instructs the shopper to pick the item at the warehouse with better availability. In some other examples, the order fulfillment engine 206 sends a message and/or instruction to a user based on the probability predicted by the machine-learned item availability model 216.

Figure 5:
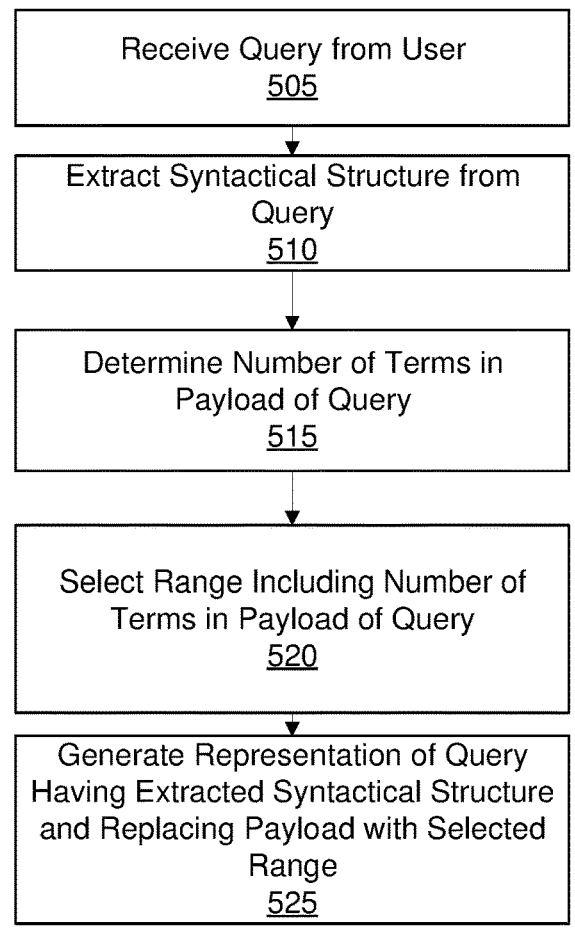
FIG. 5 is a flowchart of a method for generating anonymized representations of queries received by an online system that retain information about sizes of the queries, according to one embodiment.

Determining Anonymized Representations of Received Queries Retaining Sizing Information FIG. 5 is a flowchart of one embodiment of a method for generating anonymized representations of queries received by an online system that retain information about sizes of the queries. In various embodiments, the method includes different or additional steps than those described in conjunction with FIG. 5. Further, in some embodiments, the steps of the method may be performed in different orders than the order described in conjunction with FIG. 5. The method described in conjunction with FIG. 5 may be carried out by an online system in various embodiments. The online system referred to in conjunction with FIG. 5 may be an online concierge system 102, as further described above in conjunction with FIGS. 1 and 2, but may be any suitable online system receiving queries from users in some embodiments.

An online system, such as an online concierge system 102, receives 505 a query from a user. The query has a syntactical structure including specific operators and a payload that comprises one or more terms with specific values. For example, the query includes an operator identifying a field to search and one or more terms that are values to search for within the field identified by the operator. Hence, the syntactical structure identifies which portion, or portions, of the query include operators, and which portion, or portions of the queries, include terms specified by the user. Many queries received 505 by the online system have variable lengths, as users may provide varying numbers of terms. Additionally, the online system does not provide limitations on the numbers of terms that can be included in many queries, providing a wide range of possible lengths of queries received 505 from users. While this flexibility in numbers of terms in queries simplifies interaction with the online system by users, this increased flexibility increases difficulty of the online system in subsequently evaluating its performance in processing and returning results for different queries.

To more efficiently evaluate processing of the received query, the online system extracts 510 the syntactical structure of the received query by identifying the operators included in the received query and the terms corresponding to each of the identified operators. For example, the query includes an operator specifying a name field and an operator specifying a keyword field, so the online system parses the query to extract 510 the name field and one or more terms identifying values within the name field and to extract 510 the keyword field along with one or more terms identifying values within the keyword field. This allows the online system to identify different operators within the query and to identify the terms corresponding to the different operators.

When analyzing processing (e.g., processing time, time to return results) of the received query, anonymizing the terms specifying particular values allows the online system to account for numbers of terms included in the query for different operators, providing information about the length of payload, which includes the terms specifying the particular values, for analysis, without using the specific values of the terms in the payload. Hence, anonymizing the terms allows the online concierge system to identify and analyze performance when processing queries having different numbers of terms, so the online system determines 515 a number of terms in the payload of the received query. In some embodiments, the online system determines 515 the number of terms corresponding to each extracted operator in the received query. For example, if a query includes operators identifying a keyword field and an address field, the online system may identify a number of terms corresponding to the keyword operator and a number of terms corresponding to the address operator.

To allow for more efficient grouping of queries for analysis, the online system selects 520 a range of a plurality of numbers of terms including the number of terms in the payload of the received query. The online system maintains a plurality of ranges, with each range including a plurality of numbers, so selecting 520 the range allows the online system to provide a more generalized representation of a number of terms in the payload. In some embodiments, the online system determines a logarithm in a specific base of the number of terms in the payload of the received query and selects 520 a range corresponding to a plurality of numbers including the determined logarithm. For example, the online system determines a logarithm in base ten or a logarithm in base two of the number of terms in the payload and selects 520 a range of numbers including the determined logarithm. In the preceding example, using the logarithm in base 10 selects 520 a range from 0 to 9 for payloads with less than 10 terms, while selecting 520 a range from 10 to 99 for payloads having between 10 and 100 terms. The online system may modify the base of the logarithm used for selecting 520 the range based on an amount of detail for subsequent analysis, as using a smaller base for the logarithm selects 520 ranges including fewer numbers, providing more granular selection 520 of the range. The online system may use the characteristics of the payload to select the specific base of the logarithm determined. For example, an operator with which the payload is associated is used to select the specific base of the logarithm. As another example, a time when the query is received is used to determine the specific base of the logarithm. In other embodiments, the online system also accounts for prior processing of queries having the determined number of terms, for example, the online system increases or decreases the specific base used based on prior amounts of time for the online system to process or to analyze previously received queries also having the determined number of terms in their corresponding payloads.

Alternatively, the online system determines a square root of the number of terms in the payload of the received query and selects 520 a range corresponding to numbers including the determined square root of the number of terms in the payload. In some embodiments, the online system uses one more characteristics to determine whether to determine a logarithm in a specific base of the number of terms in the payload or to determine a square root of a number of terms in the payload. For example, if characteristics of the online system satisfy one or more criteria, the online system determines a quantity as a logarithm in the specific base of the number of terms of the payload of the received query and determines the quantity as a square root of the number of terms in the payload of the received query if characteristics of the online system satisfy one or more alternative criteria. In some embodiments, a setting maintained by the online system specifies whether the quantity is determined using a logarithm in a specific base or a square root; different settings may specify determination of the quantity for queries having different syntactical structures or including different operators. The online system then selects 520 the range including the determined quantity.

In other embodiments, the online system maintains a set of rules mapping numbers of terms in a payload to ranges that each include multiple numbers. The online system compares a number of terms in the payload to numbers in different ranges specified by the set of rules and selects 520 a range from the set of rules including the number of terms in the payload. Different sets of rules may be maintained for different syntactical structures of queries in some embodiments, although the online system may maintain different sets of rules corresponding to any suitable criteria and identify a set of rules defining various ranges based on criteria satisfied by the received query or by any other suitable parameter.

The online system generates 525 a representation of the received query having the syntactical structure of the received query with the payload replaced by the selected range including the number of terms in the payload. Hence, the representation replaces the terms in the received payload with the selected range including the number of terms in the payload. For example, the received query includes an operator identifying a keyword field and 5 terms for identifying within the keyword field, so the generated representation of the received query includes the operator identifying the keyword field and a range that includes 5. This allows the representation of the received query to provide information describing a length of the received query, while simplifying grouping of queries for analysis. Using specific lengths of received queries for analysis would result in a greater variance in lengths of payloads, resulting in minor differences in payload length preventing queries from being grouped together. Thus, representing the length of queries by ranges including the number of terms in their respective payloads allows the online system to increase a number of queries grouped together to reduce computational resources and time for analyzing how different queries were processed.

For example, to evaluate times for the online system to retrieve results for different queries, the online system generates groups of representations of received queries, with each group including representations of queries that include a common range. For example, the range for a representation of a query is selected 520 using a base 10 logarithm of the number of terms in the query, so the online system groups representations queries so a group includes representations of queries having a range between 0 and 9 and a different group includes representations of queries having a difference range between 10 and 99. This allows the online system to process a group of representations of queries having a common range as a batch, more efficiently allocating computational resources of the online system to reduce an amount of time for the online system to analyze the representations of queries.

FIG. 6 shows an example of representations of queries generated from received queries. For purposes of illustration, FIG. 6 shows terms in the payloads of received queries and selects ranges for the number of terms in the payload of a query based on a logarithm in base ten of the number of terms in the payload of the query. Query 605 in FIG. 6 has a payload including 3 terms. As the logarithm in base ten of 3 is 0.477, a range between 0-0.999 includes the value of the logarithm in base ten of the number of terms in the payload of query 605. The representation 615 of query 605 replaces the terms in the payload of query 605 with an identifier of the range including the logarithm in base 10 of the number of terms in the payload. For purposes of illustration, the representation 610 identifies the range using the minimum number included in the range, so the representation 610 of query 605 replaces the terms in the payload with the number 0. Similarly, query 615 in FIG. 6 has a payload including 10 terms, and the logarithm base 10 of 10 is 1. Hence, the representation 620 of query 615 replaces the payload of query 165 with 1, as the range of 1-1.999 includes the value of the logarithm base 10 of the number of terms in the payload of query 615.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving, at an online system, a query having a syntactical structure and a payload including one or more terms having specific values;
   extracting the syntactical structure of the received query;
   determining a number of terms in the payload of the received query;
   selecting a range including the number of terms in the payload of the received query from a plurality of ranges, each range including a plurality of numbers, wherein selecting the range comprises:
      retrieving a set of rules stored by the online system that map numbers of terms to ranges that each include multiple numbers;
      comparing the number of terms in the payload to numbers in different ranges specified by the set of rules; and
      selecting a range having a plurality of numbers including the number of items in the payload of the received query; and
   generating a representation of the query by the online system, the representation including the syntactical structure of the received query and the selected range including the number of terms in the payload of the received query in place of the payload of the received query.

2. The method of claim 1, wherein selecting the range including the number of terms in the payload of the received query from the plurality of ranges comprises:
   determining a logarithm in a specific base of the number of terms in the payload of the received query;
   selecting a range having a plurality of numbers including the determined logarithm in the specific base of the number of items in the payload of the received query.

3. The method of claim 2, wherein the specific base is two.

4. The method of claim 2, wherein the specific base is ten.

5. The method of claim 2, wherein the online system selects the specific base of the logarithm based on one or more characteristics of the payload.

6. The method of claim 5, wherein the online system further selects the specific base of the logarithm based on prior processing of queries having numbers of terms in the selected range.

7. The method of claim 1, wherein selecting the range including the number of terms in the payload of the received query from the plurality of ranges comprises:
   determining a square root of the number of terms in the payload of the received query;
   selecting a range having a plurality of numbers including the determined square root of the number of items in the payload of the received query.

8. The method of claim 1, wherein selecting the range including the number of terms in the payload of the received query from the plurality of ranges comprises:
   retrieving one or more characteristics of the online system;
   responsive to the characteristics satisfying one or more criteria, determining a quantity for the number of terms in the payload of the received query as a logarithm in a specific base of the number of terms in the payload of the received query;
   responsive to the characteristics satisfying one or more alternative criteria, determining the quantity for the number of terms in the payload of the received query as a square root of the number of terms in the payload of the received query; and
   selecting a range having a plurality of numbers including the determined quantity.

9. A computer program product comprising a non-transitory computer readable storage medium having instructions encoded thereon that, when executed by a processor, cause the processor to:
   receive, at an online system, a query having a syntactical structure and a payload including one or more terms having specific values;
   extract the syntactical structure of the received query;
   determine a number of terms in the payload of the received query;
   select a range including the number of terms in the payload of the received query from a plurality of ranges, each range including a plurality of numbers, wherein selecting the range comprises:
      retrieve a set of rules stored by the online system that map numbers of terms to ranges that each include multiple numbers;
      compare the number of terms in the payload to numbers in different ranges specified by the set of rules; and
      select a range having a plurality of numbers including the number of items in the payload of the received query; and
   generate a representation of the query by the online system, the representation including the syntactical structure of the received query and the selected range including the number of terms in the payload of the received query in place of the payload of the received query.

10. The computer program product of claim 9, wherein select the range including the number of terms in the payload of the received query from the plurality of ranges comprises:
    determine a logarithm in a specific base of the number of terms in the payload of the received query;
    select a range having a plurality of numbers including the determined logarithm in the specific base of the number of items in the payload of the received query.

11. The computer program product of claim 10, wherein the specific base is two.

12. The computer program product of claim 10, wherein the specific base is ten.

13. The computer program product of claim 10, wherein the online system selects the specific base of the logarithm based on one or more characteristics of the payload.

14. The computer program product of claim 13, wherein the online system further selects the specific base of the logarithm based on prior processing of queries having numbers of terms in the selected range.

15. The computer program product of claim 9, wherein select the range including the number of terms in the payload of the received query from the plurality of ranges comprises:
- determine a square root of the number of terms in the payload of the received query;
- select a range having a plurality of numbers including the determined square root of the number of items in the payload of the received query.

16. The computer program product of claim 9, wherein select the range including the number of terms in the payload of the received query from the plurality of ranges comprises:
- retrieve one or more characteristics of the online system;
- responsive to the characteristics satisfying one or more criteria, determine a quantity for the number of terms in the payload of the received query as a logarithm in a specific base of the number of terms in the payload of the received query;
- responsive to the characteristics satisfying one or more alternative criteria, determine the quantity for the number of terms in the payload of the received query as a square root of the number of terms in the payload of the received query; and
- select a range having a plurality of numbers including the determined quantity.

* * * * *